US005543923A

United States Patent [19]
Levers et al.

[11] Patent Number: 5,543,923
[45] Date of Patent: Aug. 6, 1996

[54] SENSOR DEVICE

[75] Inventors: Jürgen Levers, Dortmund; Norbert Bendicks, Hemer; Ralf Boebel, Dortmund; Ludwig Feldmüller, Werdohl; Berthold Esders, Schalksmühle, all of Germany

[73] Assignee: Leopold Kostal GmbH & Co. KG, Luedenscheid, Germany

[21] Appl. No.: 7,252

[22] Filed: Jan. 21, 1993

[51] Int. Cl.⁶ .................................................. G01W 1/14
[52] U.S. Cl. ............................... 356/445; 318/DIG. 2
[58] Field of Search ................................ 356/445, 239; 250/341.8; 318/480, 483, DIG. 2

[56] References Cited

U.S. PATENT DOCUMENTS 4,589,771  5/1986  Watanabe et al. ................ 318/DIG. 2
4,701,613  10/1987  Watanabe et al. ................ 250/341.8

FOREIGN PATENT DOCUMENTS

3823300C1  8/1989  Germany.

Primary Examiner—Richard A. Rosenberger
Attorney, Agent, or Firm—Brooks & Kushman P.C.

[57] ABSTRACT

A sensor device is proposed for detecting the degree of wetting of a transparent pane by precipitation. The sensor device is provided with a beam guide element, which is affixed to the pane with the aid of an optical adhesive, and is acted upon by heat by a heating apparatus. A beam transmitter and a beam receiver are associated each via a lens. Such a sensor device solves the technical problem of guaranteeing optimum conditions for the transfer of heat to the beam guide element. The beam guide element has, in the central region of its rear surface remote from the pane, a recess lying outside of the beam paths. The recess contains a heating apparatus associated via a coupling medium with the beam guide element.

16 Claims, 3 Drawing Sheets

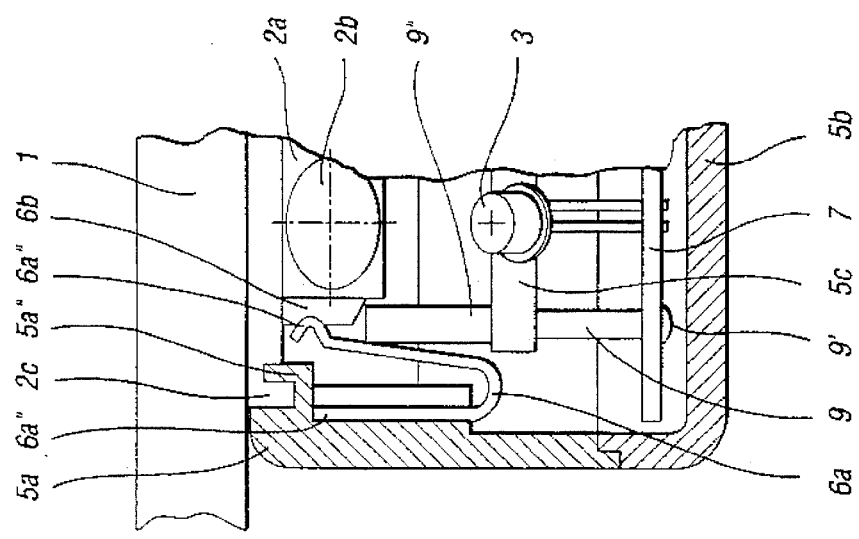
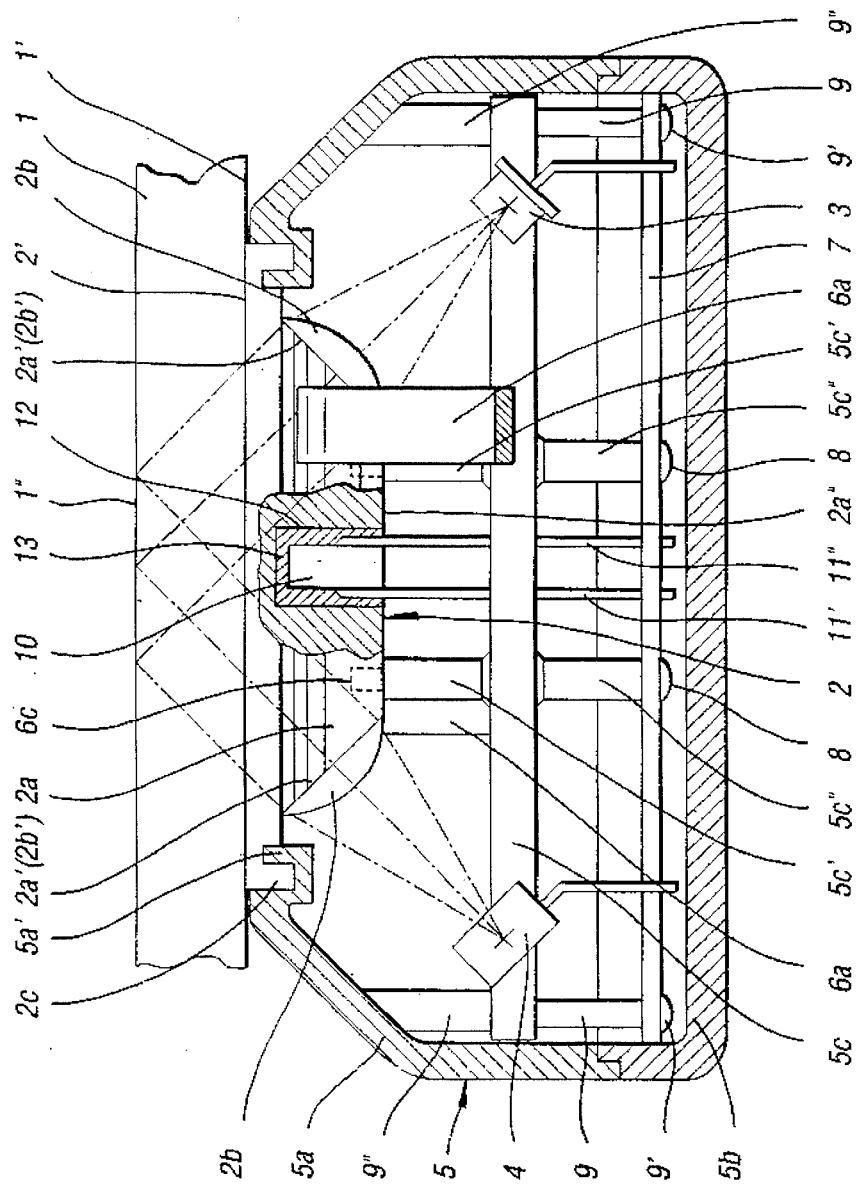

SENSOR DEVICE

TECHNICAL FIELD

The present invention relates to a sensor device for detecting the quantity and/or quality of a precipitation on a transparent pane.

BACKGROUND ART

Such devices are used in particular to influence an associated windscreen wiping system in dependence upon the quantity of precipitation on the windscreen of a motor vehicle.

A sensor device of the type specified in the preamble of the main claim has been disclosed in DE 38 23 300 C1. In that device, a heating apparatus comprising a self-regulating thermistor element is associated with a metallic reflecting means disposed in a beam guide element in order to bring the sensor device within a short time up to a specific temperature level of, for example, 40° C. The apparatus achieves a reduction in the temperature-induced errors of the components of the sensor device and partial heating of the pane. However, DE 38 23 300 C1 does not disclose the special positioning and affixing methods described in the present disclosure.

SUMMARY OF THE INVENTION

The aim of the present invention is to develop a sensor device in such a way as to guarantee optimum conditions for the transfer of heat to a beam guide element.

Said aim is achieved according to the invention by providing a heating apparatus in thermal communication with at least one beam guide element. An optically adhesive affixes the beam guide element to the inside of the windscreen. The advantage of the disclosed design is that a relatively large proportion of the heat emitted by the heating apparatus is utilizable in a defined form.

The above objects and other objects, features, and advantages of the present invention are readily apparent from the following detailed description of the best mode for carrying out the invention when taken in connection with the accompanying drawings.

Further advantageous developments of the sensor device according to the invention are indicated in the sub-claims and are described in greater detail below with reference to five embodiments, which are illustrated in the drawings.

BRIEF DESCRIPTION OF THE DRAWINGS

FIG. 1 is a view of a sensor device situated in an associated housing and provided with a heating apparatus;

FIG. 2 is a broken away side view of the sensor device of FIG. 1;

In the drawings, identical components have been given the same reference numerals.

BEST MODE FOR CARRYING OUT THE INVENTION

Figure 3:
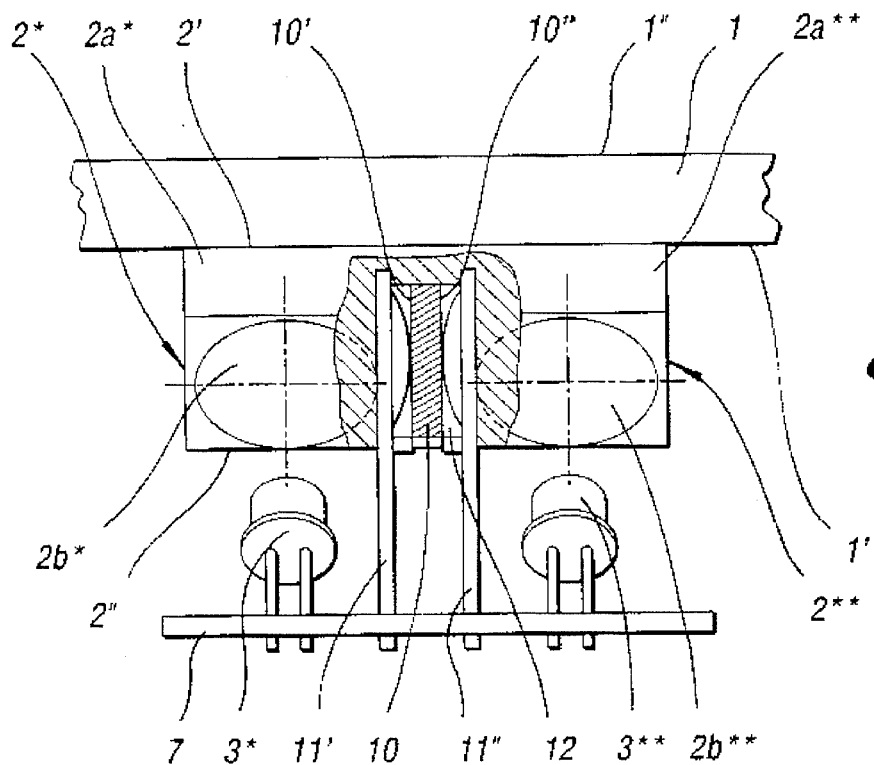
FIG. 3 is a view of the basic parts of an integrated unit comprising two sensor devices and having a first variant of the heating apparatus.

As the drawings reveal, the present invention discloses a sensor device for detecting the degree of wetting of a pane 1, preferably made of glass, by drop-shaped precipitation. The device basically comprises at least one beam guide element 2, which is associated with a beam transmitter 3 and with a beam receiver 4. The device is affixed with the aid of a an optical adhesive on the inner surface 1' of the pane 1 not exposed to the precipitation.

The pane 1 is, in particular, the windscreen of a motor vehicle on which the sensor device, disposed in a housing 5, is arranged at a suitable location upon the inner surface 1'. This is a location which does not impair vision but is selected for detecting the precipitation on the outer surface 1".

The beam guide element 2 comprises a substantially trapezoidal body 2a, on each of whose two opposing sloping faces 2a' the planar base 2b' of a geometrical lens 2b is arranged. The two, identically large, sloping faces 2a' are disposed on the body 2a in such a manner that the center lines of the two geometrical lenses 2b are offset relative to one another by an angle of approximately 90°. The bases 2b' of the geometrical lenses 2b may either be fastened to the sloping faces 2a', e.g. with the aid of a centering dowel and an optical adhesive, or be integrally formed directly on the body 2a.

As FIG. 1 and FIG. 2 reveal, the body 2a of the beam guide element 2, which is affixed to the pane 1 by an optical adhesive, is connected via holding means 6 to the multipart housing 5—preferably made of plastic. The holding means 6 comprises four substantially U-shaped holding springs 6a, lying in pairs opposite one another. Each is fastened by one end 6a' to the housing upper part 5a. The other, free, end 6a" is in the form of a clip element and catches one of the recess 6b provided in the body 2a.

Further provided in the body 2a, in the region of its rear surface 2a" remote from the pane 1, are locating or positioning openings 6c into which one end of cylindrical dowels 5c' provided on a housing carrier part 5c engages for alignment of the carrier part 5c. Said dowels 5c' extend on the other side of the carrier part 5c to form holding elements 5c" for the PCB 7. The printed-circuit board 7 is provided for connection of the beam transmitter 3 and the beam receiver 4. The board 7 is fixed to the holding element 5c", for example via fastening means 8 in the form of screws. The printed-circuit board 7 is further fixed via holes provided at its four corners to the free, preferably hot-formed ends 9' of posts 9, whose other ends are formed on the housing upper part 5a. The diameter of the upper regions 9" of the post 9 is stepped, thereby also forming a means of indexing for the carrier part 5c, which is provided with holes in its edge regions.

The housing upper part 5a is closed by a housing lower part 5b. The housing lower part 5b is connected to the housing upper part 5a via clip means which, for the sake of simplicity, are not shown in detail.

The beam guide element 2 is further provided with a peripheral, profiled extension 2c which is meshed with a correspondingly profiled region 5a' of the housing upper part 5a. To some extent, this prevents air from being able to penetrate into the sensor device and hence prevents harmful substances contained in the air (tobacco fug, plastic exhalations etc.) from being able to deposit, for example, on the geometrical lenses 2b. This also prevents the entry of extraneous radiation from the directions covered by the housing. Instead of the means described above, a suitably designed and disposed seal could be used.

A heating apparatus 10 is further connected via connecting parts 11', 11" such as metallic conductors on punched and curved contact plates to the printed conductors of the printed-circuit board 7 in order to bring the sensor device within a short time up to a specific temperature level. The heating apparatus 10 is provided in a recess 12 provided in the central region of the rear surface 2a" of the beam guide element 2. The recess is disposed and designed in such a way as to lie outside of the beam path of the rays emitted by the beam transmitter 3, then reflected by the outer surface 1" of the pane 1 and subsequently detected by the beam receiver 4.

According to the embodiment of FIGS. 1 and 2, the recess 12 takes the form of a chamber, which is open towards the rear surface 2a". The heating apparatus 10, in the form of a disk-like PTC thermistor connected at its two opposing surfaces 10', 10" by soldering to connecting parts 11', 11" is held by means of a coupling medium 13, e.g. in the form of an adhesive.

Figure 4:
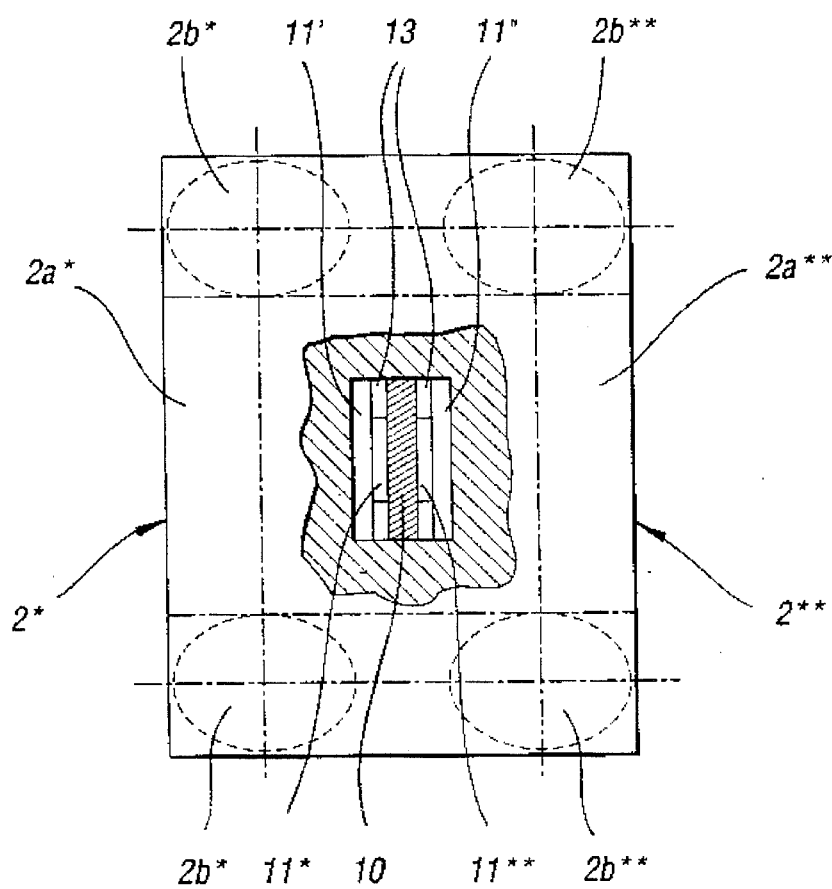
FIG. 4 is a plan view of the integrated unit of FIG. 3.

In the embodiments of FIGS. 3 and 4, two beam guide elements 2*, 2** are combined to form an integrated unit. This unit enables a greater measuring surface to be sampled because two beam transmitters 3*, 3** and two beam receivers are used, the latter not being shown for the sake of simplicity.

In order to heat the sensor device thus formed, there is provided in the central region of the rear surface 2a" of the integrated unit formed by the two bodies 2a*, 2a** a recess 12 in the form of a chamber open towards the rear surface 2a" and containing a heating apparatus 10. Said heating apparatus 10 takes the form of a PTC thermistor extending longitudinally within the inter-connected bodies 2a*, 2a**, with a spring contact region 11*, 11** provided on the one end of the two connecting parts 11', 11" coming in each case to rest against the opposite surfaces 10', 10" of the heating apparatus 10. The other two ends of the connecting parts 11', 11" are once more connected to printed conductors of the printed-circuit board 7. The coupling medium 13 to be used is preferably a gaseous substance such as, for example, air.

Figure 5:
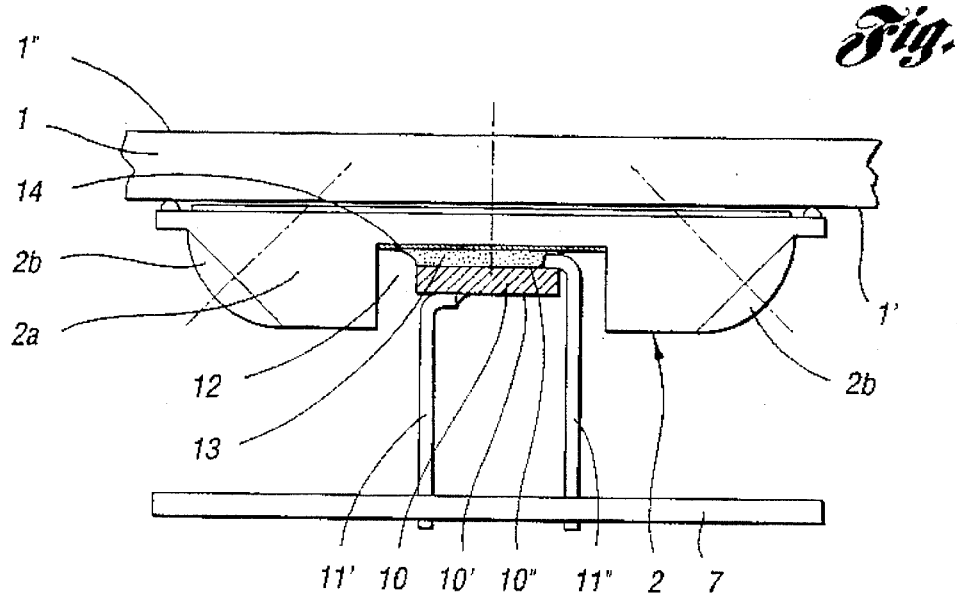
FIG. 5 is a view of the basic parts of a sensor device having a second variant of the heating apparatus.
Figure 6:
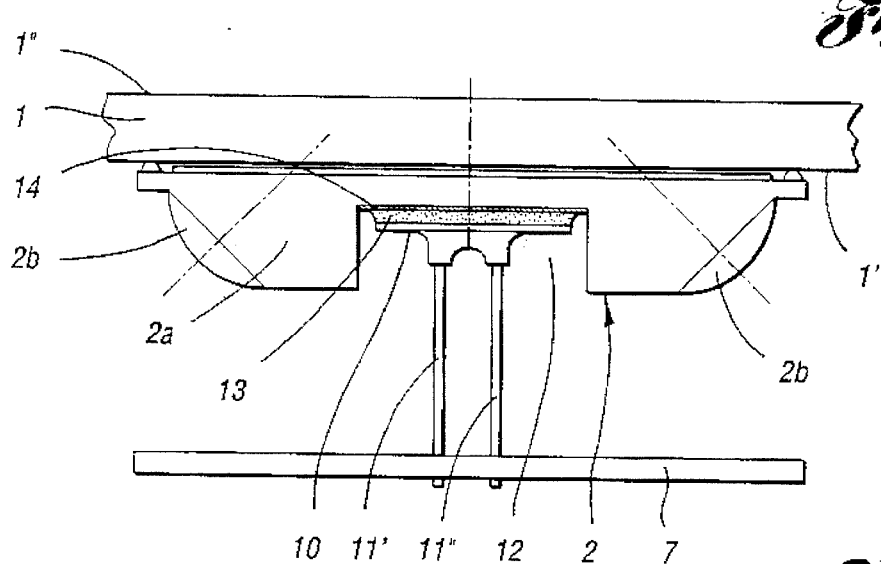
FIG. 6 is a view of the basic parts of a sensor device having a third variant of the heating apparatus.
Figure 7:
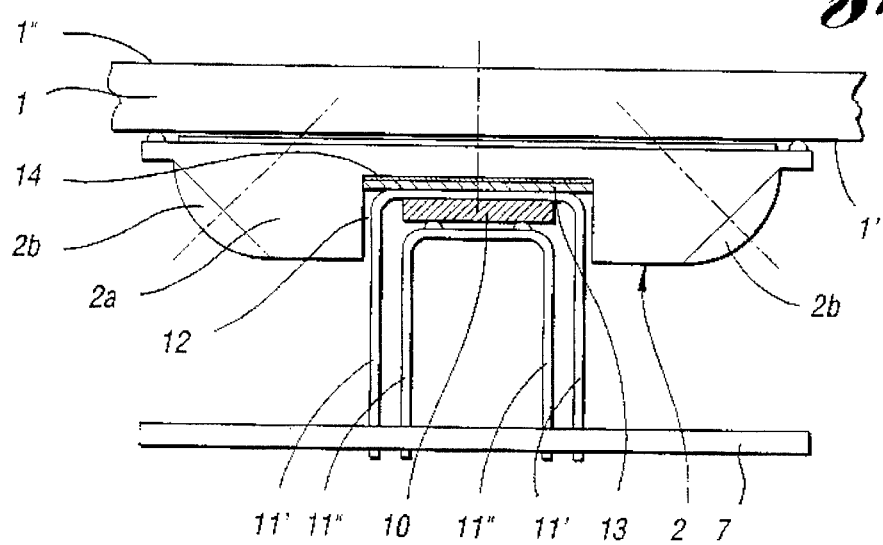
FIG. 7 is a view of the basic parts of a sensor device having a fourth variant of the heating apparatus.

FIGS. 5 to 7 show further alternate embodiments. In each, at least one beam guide element 2 is used to achieve multiple reflection of the rays emitted by the beam transmitter(s) (not shown for the sake of simplicity) and detected by the beam receiver(s) (likewise not shown for the sake of simplicity). A reflecting means 14 disposed in the recess 12 also facilitates multiple reflection.

In the embodiment of FIG. 5, the heating apparatus 10 in the form of a PTC thermistor is disposed in the channel-like recess 12 in such a way that the two opposite surfaces 10', 10" are aligned parallel to the bottom surface of the recess 12. Also connected to said two surfaces 10', 10" by means of connecting material, e.g. by soldering, are the angled ends of the connecting parts 11', 11", whose other ends are connected to printed conductors of the printed-circuit board 7. In order to connect the heating apparatus 10 to the beam guide element 2, a coupling medium 13 in the form of an adhesive is disposed between the surface 10" of the heating apparatus 10 facing the reflecting means 14 and the associated surface of the reflecting means.

In the embodiment of FIG. 6, a heating foil is inserted as a heating apparatus 10 in the channel-like recess 12. The connections (not shown for the sake of simplicity) of the heating foil are made via the connecting parts 11', 11" to the printed conductors of the printed-circuit board 7. For connecting the heating foil to the beam guide element 2, a coupling medium 13 in the form of an adhesive is provided between the heating foil and the reflecting means 14.

In the embodiment of FIG. 7, a heating apparatus in the form of a PTC thermistor is provided in the channel-like recess 12. In that embodiment, the connecting parts 11', 11" take the form of U-shaped contact plates, between and by which the heating apparatus 10 is securely held, for example, in a forced or indexing manner. Via the connecting part 11' there is then an additional support on the beam guide element 2, because the coupling medium 13 formed by an elastomeric material (e.g. silicone) is held under initial tension between the connecting part 11' and the reflecting means 14. With such a construction it is also possible to use the connecting part 11', with its surface suitably treated, as reflecting means 14. In that case the heating apparatus 10 then is connected to the reflecting means, serving simultaneously as the connecting part 11' via an electrically conductive coupling medium 13.

The possible arrangements and designs of the heating apparatus 10 disclosed in FIGS. 5 to 7 may also be used in embodiments having single rather than multiple reflections.

While the best mode for carrying out the invention has been described in detail, those familiar with the art to which this invention relates will recognize various alternative designs and embodiments for practicing the invention as defined by the following claims.

What is claimed is:

1. A sensor device for detecting the degree of wetting of a transparent pane by drops of precipitation, comprising:

at least one beam guide element having a front surface affixed to an inner surface of the pane not exposed to the precipitation in an area covered by a motor-driven windscreen wiping device, a rear surface having a central region, and first and second faces, each face disposed substantially between the front and rear surfaces, the first face associated with a beam transmitter and the second face associated with a beam receiver in such a manner that beams emitted by the beam transmitter travel along beam paths in dependence upon the precipitation and are guided to the beam receiver which supplies a signal dependent upon the precipitation;

a heating apparatus for heating the at least one beam guide element; and a non-metallic coupling medium for transferring heat from the heating apparatus to the at least one beam guide element;

wherein the central region of the rear surface of the at least one beam guide element defines a recess lying outside the beam paths adapted for receiving the heating apparatus and the coupling medium such that the heating apparatus and the coupling medium are entirely less than fully enclosed within the beam guide element and the at least one beam guide element is heated from the central region of the rear surface thereof.

2. A sensor device as in claim 1, wherein the coupling medium comprises an adhesive which affixes the heating apparatus to the at least one beam guide element.

3. A sensor device as in claim 1, wherein the coupling medium comprises an elastomeric material which supports the heating apparatus on the at least one beam guide element.

4. A sensor device as in claim 1, wherein the coupling medium comprises a gaseous substance.

5. A sensor device as in claim 1, wherein the heating apparatus comprises a resistance element which extends parallel to a bottom surface of the recess (12) and has connecting parts which communicate with printed electrical conductors of a printed-circuit board that extends parallel to the rear surface of the at least one beam guide element.

6. A sensor device as in claim 5, wherein the connecting parts comprise profiled metallic conductors.

7. A sensor device as in claim 5, wherein the connecting parts comprise punched and curved contact plates by means of which the heating apparatus is securely held.

8. A sensor device for detecting the degree of wetting of a transparent pane by drops of precipitation, comprising:

- at least one beam guide element having a front surface affixed to an inner surface of the pane not exposed to the precipitation in an area covered by a motor-driven windscreen wiping device, a rear surface having a central region, and first and second faces, each face disposed substantially between the front and rear surfaces, the first face associated with a beam transmitter and the second face associated with a beam receiver in such a manner that beams emitted by the beam transmitter travel along paths in dependence upon the precipitation and are guided to the beam receiver, which supplies a signal dependent upon the precipitation;
- a heating apparatus for heating the at least one beam guide element; and
- a non-metallic coupling medium for transferring heat from the heating apparatus to the at least one beam guide element;
- wherein the central region of the rear surface of the at least one beam guide element defines a recess adapted for receiving the heating apparatus and the coupling medium such that the heating apparatus and the coupling medium are entirely less than fully enclosed within the beam guide element and the at least one beam guide element is heated from the central region of the rear surface thereof.

9. A sensor device as in claim 8, further including a reflecting means for achieving multiple reflections of the beams and covering a bottom surface of the recess, the reflecting means being in unbroken contact with said bottom surface.

10. A sensor device as in claim 8, wherein the coupling medium comprises an adhesive which affixes the heating apparatus to the at least one beam guide element.

11. A sensor device as in claim 8, wherein the coupling medium comprises an elastomeric material which supports the heating apparatus on the at least one beam guide element.

12. A sensor device as in claim 8, wherein the coupling medium comprises a gaseous substance.

13. A sensor device as in claim 8, wherein the heating apparatus comprises a resistance element which extends parallel to a bottom surface of the recess (12) and has connecting parts which communicate with printed electrical conductors of a printed-circuit board that extends parallel to the rear surface of the at least one beam guide element.

14. A sensor device as in claim 13, wherein the connecting parts comprise contact plates, one of the contact plates being used as a reflecting means for achieving multiple reflections of the beams, said contact plate being in unbroken contact with a bottom surface of the recess.

15. A sensor device as in claim 14, wherein the heating apparatus is connected to the connecting parts via an electrically conductive adhesive.

16. A sensor device as in claim 14, wherein the heating apparatus is secured by pressure to the connecting parts.

* * * * *